United States Patent
Ingle, Jr. et al.

(10) Patent No.: US 9,732,244 B2
(45) Date of Patent: *Aug. 15, 2017

(54) LATEXES AND ASSOCIATED INK-JET INKS

(75) Inventors: David Michael Ingle, Jr., San Diego, CA (US); Phillip C. Cagle, San Diego, CA (US); Paul Joseph Bruinsma, San Diego, CA (US); Max Yen, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/426,572

(22) PCT Filed: Sep. 14, 2012

(86) PCT No.: PCT/US2012/055633
§ 371 (c)(1),
(2), (4) Date: Mar. 6, 2015

(87) PCT Pub. No.: WO2014/042651
PCT Pub. Date: Mar. 20, 2014

(65) Prior Publication Data
US 2015/0225586 A1 Aug. 13, 2015

(51) Int. Cl.
*C09D 11/00* (2014.01)
*C09D 11/38* (2014.01)
*C09D 11/106* (2014.01)
*C09D 11/12* (2006.01)
*C09D 11/30* (2014.01)
*C09D 11/322* (2014.01)
*C09D 11/107* (2014.01)
*C09D 11/36* (2014.01)
*C08F 20/18* (2006.01)
*C08F 2/00* (2006.01)
*C08F 2/24* (2006.01)

(52) U.S. Cl.
CPC ............ *C09D 11/38* (2013.01); *C08F 2/001* (2013.01); *C08F 2/24* (2013.01); *C08F 20/18* (2013.01); *C09D 11/106* (2013.01); *C09D 11/107* (2013.01); *C09D 11/12* (2013.01); *C09D 11/30* (2013.01); *C09D 11/322* (2013.01); *C09D 11/36* (2013.01)

(58) Field of Classification Search
CPC ......... C09D 11/10; C09D 11/00; C09D 11/30; C09D 11/023; C09D 11/12; C08L 2205/04; C08L 2205/02; C08L 2205/025; C08L 2201/50; C08L 2201/52; C08L 2201/54
See application file for complete search history.

(56) References Cited

U.S. PATENT DOCUMENTS

| | | | | |
|---|---|---|---|---|
| 4,686,260 A | * | 8/1987 | Lindemann | C08F 257/02 523/222 |
| 5,134,186 A | * | 7/1992 | Ingle | C09D 151/003 524/548 |
| 5,308,890 A | | 5/1994 | Snyder | |
| 6,020,399 A | | 2/2000 | Matzinger | |
| 6,039,796 A | | 3/2000 | Kubota et al. | |
| 6,184,268 B1 | | 2/2001 | Nichols et al. | |
| 6,689,837 B1 | | 2/2004 | Matzinger | |
| 7,427,641 B2 | | 9/2008 | Kataoka et al. | |
| 7,470,751 B2 | * | 12/2008 | Taylor | C08K 3/0016 524/284 |
| 7,705,070 B2 | | 4/2010 | Vincent et al. | |
| 8,888,265 B2 | * | 11/2014 | Okuda | C09D 11/40 347/100 |
| 9,109,133 B2 | * | 8/2015 | Yamazaki | C08K 5/175 |
| 9,133,355 B2 | * | 9/2015 | Brandstein | C09D 11/30 |
| 2004/0085419 A1 | | 5/2004 | Yau et al. | |
| 2006/0063868 A1 | * | 3/2006 | Janmaat | C08F 257/02 524/160 |
| 2006/0173096 A1 | * | 8/2006 | Ota | C09D 11/326 523/161 |

FOREIGN PATENT DOCUMENTS

| | | | | |
|---|---|---|---|---|
| CN | 101029194 | | 9/2007 | |
| CN | 101029194 A | * | 9/2007 | ............ C09D 11/10 |
| CN | 101348539 A | * | 1/2009 | ............ C08F 220/10 |
| CN | 102248777 | | 11/2011 | |
| CN | 102617771 | | 8/2012 | |
| CN | 102617771 A | * | 8/2012 | ............ C08F 220/18 |
| CN | 102649889 A | * | 8/2012 | ............ C09D 11/10 |
| CN | 102558961 B | * | 9/2013 | ............ C09D 11/10 |
| EP | 0 874 030 A2 | * | 10/1998 | ............ C09D 11/12 |
| EP | 0874030 | | 10/1998 | |
| EP | 2371574 | | 10/2011 | |
| JP | 1995-041683 | | 2/1995 | |
| JP | 2000318306 | | 11/2000 | |
| JP | 2006524269 | | 10/2006 | |
| WO | 0052082 | | 9/2000 | |
| WO | 0138412 | | 5/2001 | |
| WO | 0144326 | | 6/2001 | |
| WO | WO 2013/092515 A2 | * | 6/2013 | ............ C08F 2/00 |

OTHER PUBLICATIONS

International Search Report and Written Opinion dated Mar. 26, 2013 for International Application No. PCT/US2012/055633 filed Sep. 14, 2012, Applicant Hewlett-Packard Development Company, L.P. et al.

(Continued)

*Primary Examiner* — Rip A Lee
(74) *Attorney, Agent, or Firm* — HP Inc. Patent Department

(57) ABSTRACT

The present disclosure provides ink-jet inks and associated methods. In one example, an ink jet ink can comprise an ink vehicle, a wax emulsion, and a latex particulate. The latex particulate can comprise multiple intermingled discrete polymer strands, including: a low Tg polymer strand having a Tg below 50° C. and a high Tg polymer strand having a Tg at 50° C. or above. Additionally, the Tg of the high Tg polymer strand can be at least 50° C. greater than the Tg of the low Tg polymer strand.

15 Claims, No Drawings

(56) References Cited

OTHER PUBLICATIONS

Extended European Search Report dated Apr. 11, 2016 for PCT/US2012/055633, Applicant Hewlett-Packard Development Company, L.P.
Hourston et al., Latex Interpenetrating Polymer Networks Based on Acrylic Polymers. I. Predicted and Observed Compatibilities, Journal of Applied Polymer Science, vol. 29, 2969-2980 (1984).
Hourston et al., Latex Interpenetrating Polymer Networks Based on Acrylic Polymers. II. The Invluence of the Degree of Network Compatibility on Morphology, Journal of Applied Polymer Science, vol. 31, 1955-1962 (1986).
Hourston et al., Latex Interpenetrating Polymer Networks Based on Acrylic Polymers. III. Synthesis Variations, Journal of Applied Polymer Science, vol. 33, 215-225 (1987).
Hourston et al., Latex Interpenetrating Polymer Networks Based on Acrylic Polymers. IV. The Influence on Mechanical Properties of the Time of Swelling the Seed Particles with the Second Monomer, Journal of Applied Polymer Science, vol. 34, 901-908 (1987).
Borthakur et al., Preparation of core-shell latex particles by emulsion co-polymerization of styrene and butyl acrylate, and evaluation of their pigment properties in emulsion paints, J. Coat. Technol. Res., 7 (6) 765-722 (2010).

\* cited by examiner

LATEXES AND ASSOCIATED INK-JET INKS

BACKGROUND

Digital inkjet printing of signs and other graphic arts applications is increasingly replacing screen printing and other analog printing technologies. Digital inks for large format printing provide good image quality, durability, and permanence. While many of the inks in use are solvent-based, in recent years efforts have been made to replace solvent with water-based inks. Many of the media substrates are nonporous coated papers or polymer films such as vinyl.

Durability of aqueous inks on nonporous medias poses a challenge. Inks need to wet and adhere to a broad range of substrates, have good abrasion and scratch resistance, resist attack by water, cleaning fluids, and solvents, and have good outdoor weatherability. There have been great improvements in the durability of aqueous ink-jet inks through incorporation of certain ink-jet compatible latex polymer dispersions made by emulsion polymerization. When printed as part of an ink-jet ink, a latex component of the ink can form a film on a media surface, entrapping and protecting the colorant within the hydrophobic print film.

This being said, while latex particulates can improve durability of prints, they undergo severe thermal shear conditions when printed through thermal ink-jet print heads, leading to nozzle reliability issues. Moreover, those polymers tend to settle out of inks over time and, therefore, often are not stable in many storage conditions. Thus, there is a continuing need to provide latex particulates having improved stability and durability for printing on a wide variety of media types and with a variety of printing architectures.

DETAILED DESCRIPTION

It has been recognized that ink-jet inks can incorporate latex particulates designed to mimic polyurethane structure using non-polyurethane components in conjunction with wax emulsions to provide excellent print durability properties. In accordance with this, ink-jet ink compositions and associated methods described herein can include intermingled low Tg polymer strands and high Tg polymer strands providing for a unique latex structure. It is noted that when discussing the present inks and methods, each of these discussions can be considered applicable to each of these embodiments, whether or not they are explicitly discussed in the context of that embodiment. Thus, for example, in discussing a latex particulate in an ink-jet ink, such a latex particulate can also be used in a method of manufacturing an ink-jet ink, and vice versa.

Generally, polyurethane latex particulates provide desirable characteristics in printing applications including excellent scratch resistance. However, it has been recognized that ink-jet inks can include a wax and non-polyurethane latex particulates manufactured having a structure that mimics polyurethane dispersion particulates thereby providing superior scratch resistance without the use of polyurethane materials. To this end, the present inventors have discovered that vinyl monomers can be used to mimic the soft and hard domains found in polyurethane polymers by synthesizing vinyl latex particulates having intermingled low Tg polymer strands and high Tg polymer strands, and that such latex particulates can be formulated into ink-jet inks with a minimal amount of wax emulsions that provide superior printing results.

With the above in mind, an ink-jet ink can comprise an ink vehicle, a wax, and a latex particulate. Generally, the latex particulate can comprise multiple intermingled discrete polymer strands, including a low Tg polymer strand having a Tg below 50° C. and a high Tg polymer strand having a Tg at 50° C. or above. Additionally, in one example, the Tg of the high Tg polymer strand can be at least 50° C. greater than the Tg of the low Tg polymer strand. The ink-jet can also include a colorant. In one aspect, the colorant can be a pigment. In one specific aspect, the pigment can impart color to the ink.

Generally, the present ink-jet inks include a wax. Wax emulsions are commercially available from a number of vendors, for example Keim-Additec, Lubrizol, Michelman, and BYK Chemie. Wax emulsions that are useful in this invention include but are not limited to: Lubrizol: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942.

In one example, the wax can have a melting point ranging from 60° C. to 110° C. Generally, the wax can have a particle size ranging from 50 nm to 600 nm. In one example, the wax can have a particle size ranging from 200 nm to 300 nm. Generally, the wax can be present in the ink at a concentration ranging from 0.25 wt % to 5 wt %. In one example, the wax can be present ranging from 0.5 wt % to 1.5 wt %. Additionally, the wax emulsions can be compatible with high acid acrylic dispersants and hydrocolloids. By compatible, the present waxes can be used without causing aggregation or precipitation of the dispersants/hydrocolloids particularly over extended periods of time (weeks/months at ambient temperature or days/weeks at elevated temperature such as 40° to 65° C.). Incompatibility can manifest itself variously by increases in wax particle size, phase separation of wax, or creaming at a faster rate than in the absence of destabilizing materials.

As discussed herein, a latex particulate can comprise multiple intermingled discrete polymer strands, including a low Tg polymer strand having a Tg below 50° C. and a high Tg polymer strand having a Tg at 50° C. or above. The Tg of the high Tg polymer strand can be at least 50° C. greater than the Tg of the low Tg polymer strand, and the refractive index of the low Tg polymer strand can be within 1% of the refractive index of the high Tg polymer strand. Notably, by matching the refractive index of the polymer strands, the present latex particulates can provide superior gloss and haze. As used herein, "latex particulate" or "latex" refers to discrete polymeric particles dispersed in a liquid. In one example, a latex particulate can be dispersed in a liquid vehicle to form an ink. In one aspect, the ink can be an ink-jet ink and can further comprise a colorant.

The low Tg polymer strand can be prepared from multiple co-monomers. Such multiple co-monomers generally include 2 or more monomers. The high Tg polymer strand can be prepared from the same monomers used in the preparation of the low Tg polymer strand but at a different ratio. In one example, the low Tg polymer strand can be polymerized from two monomers in a ratio ranging from 80:20 to 50:50 and the high Tg polymer strand can be polymerized from the same monomers in a ratio ranging from 40:60 to 5:95. The ratio of soft to hard polymer strand can vary from 50:50 to 10:90. Varying the ratio can provide for different Tgs. By using the same co-monomers, the polymer strands can have a similar refractive index; by using three co-monomers, the polymers' refractive index can be controlled with even greater accuracy while controlling Tg simultaneously. In one example, the refractive index of the low Tg polymer strand can be within 1% of the refractive index of the high Tg polymer strand. In one aspect, the refractive index of the low Tg polymer strand can be within 0.5% of the refractive index of the high Tg polymer strand. Additionally, the multiple co-monomers can be selected to have a refractive index within 1% of one another when polymerized, or in one aspect, within 0.5% of each other when polymerized.

Generally, the low Tg polymer strand and the high Tg polymer strand having differing Tg's such that the resulting latex particulate provides hard and soft domains similar to a polyurethane particle. In one example, the Tg of the low Tg polymer strand can be below 20° C. In one aspect, the Tg can be below 0° C. In another example, the Tg of the high Tg polymer strand can be at 90° C. or above. In one aspect, the Tg can be above 100° C. Additionally, the difference in the Tg's between the low Tg polymer strand and the high Tg polymer strand is generally at least 50° C. In one example, the difference can be at least 70° C. In one aspect, the difference can be at least 90° C., and in another aspect, can be at least 100° C.

The monomers used in the present polymer strands can be vinyl monomers. In one example, the monomers can be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one aspect, the monomers can include acrylates, methacrylates, and styrenes. Additionally, the monomers can include hydrophilic monomers including acid monomers, and hydrophobic monomers. Monomers that can be polymerized in forming the high Tg and low Tg polymer strands include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

Acidic monomers that can be polymerized in forming the high Tg and low Tg polymer strands include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

As used herein, "liquid vehicle" or "ink vehicle" refers to the liquid fluid in which a latex particulate and wax are placed to form an ink. In one example, the liquid vehicle can also include a colorant. Ink vehicles are well known in the art, and a wide variety of ink vehicles may be used with the systems and methods of the present invention. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc., provided there are no multivalent metal salts present in the liquid vehicle. Additionally, the term "aqueous liquid vehicle" or "aqueous vehicle" refers to a liquid vehicle including water as a solvent. In one aspect, water can comprise a majority of the liquid vehicle.

Further, as mentioned, the inks of the present disclosure can also include a colorant, which can be a dye and/or pigment. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics, metallic particulates, or other opaque particles.

Regarding the latex particulates, the latexes can have various shapes, sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 200,000 to 300,000.

Further, the average particle diameter of the latex particles can be from about 10 nm to about 1 μm; in some other examples, from about 10 nm to about 500 nm; and, in yet other examples, from about 100 nm to about 300 nm. The particle size distribution of the latex is not particularly limited, and either latex having a broad particle size distribution, bimodal particle size distribution, or latex having a mono-dispersed particle size distribution may be used. It is also possible to use two or more kinds of latex particles each having a mono-dispersed particle size distribution in combination.

The ink-jet ink compositions of the present disclosure can also be suitable for use on many types of substrates of recording media, including but not limited, non-porous vinyl media. In one example, the media can be gloss media. As used herein, "gloss" refers generally to the amount of light reflected by an object's surface, such as, e.g., an inkjet media surface. Gloss can be quantified and measured relative to specific specular angles from an object surface. The specular angle is the angle equal to but opposite the angle of incidence. This specular light is responsible for the highlights visible on shiny materials. When quantifying gloss, it can be measured at angles of 20°, 60°, and 85° off of the normal. Gloss measurements are indicated by gloss units in relation to the angle used for measurement. In one specific example, as used herein, "60° gloss" is the gloss of an image measured by using "BYK-Gardner micro-TRI-gloss" meter with incident angle set at 60°.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like. In one example, the ink vehicle can be predominantly water and can be referred to as an aqueous liquid vehicle.

In one embodiment, the present ink-jet inks can include alkyl ethoxylate surfactants. Such surfactants can include, but are not limited to, TERGITOL® 15-S-7, TERGITOL® 15-S-9, TERGITOL® TMN-6 90%, and NEODOL® 91-6. In one example, the surfactant can have an HLB value ranging from about 12 to about 13.5. As used herein, "HLB" refers to hydrophile-lipophile-balance which is a measure of the balance or proportion of hydrophilic to lipophilic portions of a molecule. In another example, the surfactant can be present in the ink-jet ink at a concentration ranging from about 1.5 wt % to about 3.5 wt %. In still another example, the surfactant can have a pour point of less than 10° C. As used herein, "pour point" refers to is the lowest temperature at which a liquid becomes semi solid and loses its flow characteristics.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one example, for printing on non-porous media, the present inks can comprise an ink vehicle, a surfactant, and a cationic polymer, where the ink vehicle includes water and co-solvent. The co-solvent can have a boiling point from 160° C. to 250° C. and is generally present in an amount of 1 wt % to 40 wt %, such that the ink is formulated for printing on non-porous media. Also, the ink vehicle generally does not include more than 5 wt % volatile co-solvent, where "volatile" is defined as a solvent having a boiling point lower than 160° C., and also does not generally include more than 3 wt % non-volatile co-solvent, hereby defined as a solvent having a boiling point greater than 250° C. Water is not a solvent or co-solvent, but is in addition to the co-solvents of the present disclosure. In one specific aspect, the ink vehicle can include multiple co-solvents having a boiling point ranging from 160° C. to 250° C. In another example, the ink vehicle can be devoid of non-volatile solvent. In still another example, the ink vehicle can be devoid of volatile solvent.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

In addition to the ink-jet inks described herein, the present disclosure provides for methods relating thereto. Generally, a method of making an ink-jet ink can comprise dispersing a wax emulsion and a latex in an ink vehicle. The wax emulsion and the latex can be any of those described herein.

Further the method can include polymerizing a first ratio of multiple co-monomers to form first polymer strands, introducing a second ratio of the same co-monomers, and polymerizing the second ratio of the same co-monomers to form the latex particulate including second polymer strands that are discrete and intermingled with the first polymer strands.

The latex particulate is generally formed in two stages, forming a first set of polymer strands and then a second set of polymer strands. Without intending to be bound by any particular theory, it is thought that after the first polymer strands are synthesized into an initial latex particulate, a second ratio of the monomers can be introduced to the initial latex particulate, the monomers form the second set of polymer strands within the initial latex particulate thereby forming a final latex particulate that comprises two different types of discrete polymer strands that are intermingled. Notably, such latex structure is different than traditional copolymer and/or homogenous copolymer latexes or core/shell latexes that have a first polymer in an inner core and a second polymer forming an outer shell around the core.

In one example, the first polymer strands can be low Tg polymer strands and the second polymer strands can be high Tg polymer strands. Alternatively, in another example, the first polymer strands can be high Tg polymer strands and the second polymer strands can be low Tg polymer strands. As such, the present latex structure can be manufactured independently of the sequence of polymer strand formation.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

Perceived color quality can be quantified using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present latex compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present ink set compositions and methods have been described above with particularity, the following examples provide further detail in connection with what are presently deemed to be the acceptable embodiments.

Example 1

Latex Preparation A

A latex particulate was prepared as follows. Water (169 g) was heated to 77° C. with mechanical agitation. An aqueous emulsion comprised of water (13.7 g), copolymerizable surfactant Hitenol BC-10 (0.70 g) (Dai-Ichi Kogyo Seiyaku Co., Ltd), styrene (17.7 g) and butyl acrylate (37.5 g) was prepared. At 77° C., 2 g (3%) of this monomer emulsion was added to the reactor followed by 0.37 g potassium persulfate (dissolved in a minimal amount of water). After 15 minutes, this monomer mixture was added to the reactor over 72 minutes. When the first polymerization was completed, a second emulsion comprised of water (34.9 g), copolymerizable surfactant Hitenol BC-10 (1.6 g), styrene (21.1 g), methyl methacrylate (99.0 g), butyl acrylate (6.1 g) and methacrylic acid (2.6 g) was added over 168 minutes. Residual monomer was reduced by typical methodology; i.e., using ascorbic acid and t-butyl hydroperoxide. After cooling to near ambient temperature, pH was adjusted to ~8 with dilute potassium hydroxide; inkjet suitable aqueous biocides were added. The two monomer compositions' average homopolymer refractive indices were 1.5±0.2. The resulting acrylic latex was 41% solids; particle size 0.23μ; viscosity <50 cps and had a latex structure consisting of intermingled polymer strands.

Example 2

Latex Preparation B—Comparative Latex

A latex particulate was prepared as follows. Water (125 g) was heated to 77° C. with mechanical agitation. An aqueous emulsion comprised of water (29.5 g), copolymerizable surfactant Hitenol BC-10 (1.5 g) (Dai-Ichi Kogyo Seiyaku Co., Ltd), methyl methacrylate (88.9 g), styrene (25.5 g) and butyl acrylate (4.7 g), methacrylic acid (0.6 g) was made. At 77° C., 2 g (1%) of this monomer emulsion was added to the reactor followed by 0.12 g potassium persulfate (dissolved in a minimal amount of water). After 15 minutes, this monomer mixture was added to the reactor over 180 minutes. Residual monomer was reduced by typical methodology; i.e., using ascorbic acid and t-butyl hydroperoxide. After cooling to near ambient temperature, pH was adjusted to ~8 with dilute potassium hydroxide; inkjet suitable aqueous biocides were added. The resulting acrylic latex was 41% solids; particle size 0.22μ; viscosity <50 cps and had a traditional homogenous latex structure.

Example 3

Latex Preparation C

A latex particulate was prepared as follows. Water (169 g) was heated to 77° C. with mechanical agitation. An aqueous emulsion comprised of water (34.9 g), copolymerizable surfactant Hitenol BC-10 (1.6 g) (Dai-Ichi Kogyo Seiyaku Co., Ltd), styrene (21.1 g), methyl methacrylate (99.0 g), butyl acrylate (6.1 g) and methacrylic acid (2.6 g) was prepared. At 77° C., 2 g (1.4%) of the monomer emulsion was added to the reactor followed by 0.37 g potassium persulfate (dissolved in a minimal amount of water). After 15 minutes, this monomer mixture was added over 168 minutes. When the first polymerization was completed, a second emulsion comprised of water (13.7 g), copolymerizable surfactant Hitenol BC-10 (0.70 g), styrene (17.7 g) and butyl acrylate (37.5 g) was added over 72 minutes. Residual monomer was reduced by typical methodology using ascorbic acid and t-butyl hydroperoxide. After cooling to near ambient temperature, pH was adjusted to ~8 with dilute potassium hydroxide; inkjet suitable aqueous biocides were added. The two monomer compositions' average homopolymer refractive indices are 1.5±0.2. The resulting acrylic latex is 41% solids; particle size 0.23μ; viscosity <50 cps and had a latex structure consisting of intermingled polymer strands.

Example 4

Latex Preparation D—Comparative Latex

A latex particulate was prepared as follows. Water (191.6 g) was heated to 77° C. with mechanical agitation. An aqueous emulsion comprised of water (16.6 g), copolymerizable surfactant Hitenol BC-10 (0.35 g) (Dai-Ichi Kogyo Seiyaku Co., Ltd), methyl methacrylate (21.1 g), 2-ethylhexyl acrylate (49.3 g) and tetraethyleneglycol dimethacrylate (1.4 g) was prepared. At 77° C., 2.7 g (3%) of this monomer emulsion was added to the reactor followed by 0.37 g potassium persulfate (dissolved in a minimal amount of water). After 15 minutes, the monomer emulsion mixture was added over 180 minutes. When the first polymerization was completed, a second emulsion comprised of water (21.5 g), copolymerizable surfactant Hitenol BC-10 (1.3 g), styrene (50.2 g), methyl methacrylate (50.4 g), butyl acrylate (5.0 g) and methacrylic acid (0.5 g) was added over 90 minutes. Residual monomer was reduced by typical methodology using ascorbic acid and t-butyl hydroperoxide. After cooling to near ambient temperature, pH was adjusted to ~8 with dilute potassium hydroxide; inkjet suitable aqueous biocides were added. The two monomer compositions' homopolymer refractive indices were 1.45 and 1.54, resp. The resulting acrylic latex is 41% solids; particle size 0.23μ; viscosity <50 cps and had a core/shell structure.

Example 5

Ink-Jet Ink Preparation

An ink-jet ink was formulated with the latex of Example 1, according to the compositional elements and amounts listed in Table 1.

TABLE 1

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Latex from Example 1 | 7 |
| Pigment dispersion (black) | 1.5 |
| Michem ® Emulsion 48040M2 | 1 |
| Water | Balance |

Example 6

Comparative Ink-Jet Ink

A comparative ink was formulated with the latex of Example 2, according to the compositional elements and amounts listed in Table 2.

TABLE 2

| Compositional Elements (on active basis) | Ink (wt %) |
|---|---|
| 2-Pyrrolidinone | 16 |
| 2-Methyl-1,3-propanediol | 9 |

TABLE 2-continued

| Compositional Elements (on active basis) | Ink (wt %) |
|---|---|
| Crodafos ™ N3 Acid | 0.5 |
| Nonionic surfactant | 0.5 |
| Silicone surfactant | 1.0 |
| Latex from Example 2 | 7 |
| Pigment dispersion (black) | 1.5 |
| Michem ® Emulsion 48040M2 | 1 |
| Water | Balance |

Example 7

Ink-Jet Ink

An ink-jet ink was formulated with the latex of Example 3, according to the compositional elements and amounts listed in Table 3.

TABLE 3

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Latex from Example 3 | 7 |
| Pigment dispersion (black) | 1.5 |
| Michem ® Emulsion 48040M2 | 1 |
| Water | Balance |

Example 8

Data

The inks of Examples 5 and 6 were tested for L* and fingernail scratch testing for varying levels of wax emulsions as shown in Table 4. Additionally, the inks of Examples 5 and 7 were tested for L* and finger nail scratch testing as shown in Table 5. Further, the latexes from Examples 1 and 2 were tested for Tg.

TABLE 4

|  |  | Wax Emulsion Level (wt %) | | | | |
|---|---|---|---|---|---|---|
|  |  | 0.0 | 0.5 | 1.0 | 1.5 | 2.0 |
| Black L* | Example 5 | 7.7 | 8.0 | 9.3 | 7.9 | 9.0 |
|  | Example 6 | 6.3 | 7.1 | 8.8 | 14.9 | 18.4 |
| Fingernail Scratch‡ | Example 5 | 2 | 0.5 | 0.5 | <0.5 | <0.5 |
|  | Example 6 | 3 | 3 | 2 | 1.5 | 0.5 |

‡Scale: 5 = Poor; 0 = Excellent

TABLE 5

|  | Wax Emulsion Level | 1.0 wt % |
|---|---|---|
| Black L* | Example 5 | 9.3 |
|  | Example 7 | 9.5 |
| Fingernail Scratch‡ | Example 5 | 0.5 |
|  | Example 7 | 0.5 |

‡Scale: 5 = Poor; 0 = Excellent

TABLE 6

| Measured Glass Transition (Tg) Temperature | |
|---|---|
| Example 1‡ | 106° C. |
| Example 2 | 106° C. |

‡No low Tg transition was seen

As shown in Table 4, the ink with the present latex provided better durability than the comparative ink having a traditional homopolymer structure as evidenced by the fingernail scratch testing. Additionally, the L* value was significantly improved at concentrations over 1% of wax emulsion. Notably, excellent results were achieved for the present ink at 1.0%, 1.5% and 2.0% levels.

As shown in Table 5, the properties of the present latexes are independent of the order of manufacture. Specifically, regardless of which polymer strands were first synthesized, the latexes provided for the same characteristics as both formed the same type of structure, i.e., intermingled polymer strands. Such results provide evidence that the present latexes are structurally different than core/shell structured latexes, as core/shell would provide significantly different properties depending on which latex was present as the shell.

As shown in Table 6, the glass transition temperature (Tg) was tested for the latex of the present invention as well as the comparative homogenous latex. Similar to the homogenous latex, the present latex had no low Tg. The lack of two distinct Tg's indicate that the present latex comprise intermingled discrete polymer strands rather than a core/shell structure which would be expected to have two differing Tg's.

Example 8

Additional Wax-Containing Ink Jet Ink Formulations

Various wax-containing ink-jet inks were formulated with the latex of Example 1, according to the compositional elements and amounts listed in Tables 7 and 8. The resulting scratch resistance is provided in Table 8.

TABLE 7

| Compositional Elements (on active basis) | Ink (wt %) |
|---|---|
| 2-Pyrrolidinone | 16 |
| 2-Methyl-1,3-propanediol | 9 |
| Crodafos ™ N3 Acid | 0.5 |
| Nonionic surfactant | 0.5 |
| Silicone surfactant | 1.0 |
| Potassium hydroxide to pH 8 | Var. |
| Latex from Example 1 | 7 |
| Pigment dispersion (black) | 1.5 |
| Wax Emulsion from Table 7 | 1 |
| Water | Balance |

TABLE 8

| Wax Emulsion | Manufacturer | mp, ° C. | Particle Size, Mv, μ | Scratch Resistance |
|---|---|---|---|---|
| Liquilube ™ 405 | Lubrizol | 105 | 0.28 | 0 |
| ME48040 | Michelman | 85 | 0.24 | 0.5 |
| Aquaslip ™ 942 | Lubrizol | 83 | 0.11 | 2.0 |
| Aquaslip ™ 671 | Lubrizol | 123 | 0.13 | 2.0 |
| Liquilube ™ 426 | Lubrizol | 85 to 105 | 0.04 | 3.0 |
| Ultralube ® E-846 | Keim-Additec | 138 | 0.16 | 3.0 |

‡Scale: 5 = Poor; 3 = no improvement; 0 = Excellent

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An ink-jet ink, comprising:
   an ink vehicle;
   a wax emulsion present in the ink at a concentration ranging from 0.2 wt % to 5 wt %, wherein the wax emulsion has wax particles with sizes ranging from 50 nm to 600 nm; and
   a latex particulate that does not have a core/shell structure, comprising multiple intermingled discrete polymer strands, including:
   low Tg polymer strands and
   high Tg polymer strands intermingled with the low Tg polymer strands;
   wherein the Tg of the high Tg polymer strands is at least 50° C. greater than the Tg of the low Tg polymer strands, and
   wherein the Tg of the low Tg polymer strands is below 20° C. and the Tg of the high Tg polymer strands is at 90° C. or above.

2. The ink-jet ink of claim 1, wherein the wax emulsion comprises a wax having a melting point ranging from 60° C. to 110° C.

3. The ink-jet ink of claim 1, wherein the wax emulsion is present in the ink at a concentration ranging from 0.5 wt % to 1.5 wt % and wherein the wax emulsion has wax particles with sizes ranging from 200 nm to 300 nm.

4. The ink-jet ink of claim 1, wherein the average homopolymer refractive index of monomers of the low Tg polymer strands is within 1% of the average homopolymer refractive index of monomers of the high Tg polymer strands.

5. The ink-jet ink of claim 1, wherein the ink vehicle includes water and co-solvent having a boiling point from 160° C. to 250° C., the co-solvent present in an amount of 1 wt % to 40 wt %; and wherein the ink vehicle includes no more than 3 wt % non-volatile co-solvent having a boiling point greater than 250° C. and no more than 5 wt % volatile co-solvent having a boiling point lower than 160° C.

6. The ink-jet ink of claim 1, wherein the low Tg polymer strands are prepared from multiple co-monomers and the high Tg polymer strands are prepared from the same multiple co-monomers at a different ratio.

7. The ink-jet ink of claim 6, wherein the multiple co-monomers are selected so that the average homopolymer refractive index of the monomers of the low Tg polymer strands is within 1% of the average homopolymer refractive index of the monomers of the high Tg polymer strands.

8. The ink-jet ink of claim 1, wherein the Tg of the high Tg polymer strands is at least 100° C. above the Tg of the low Tg polymer strands.

9. The ink-jet ink of claim 1, wherein the monomers of the low Tg polymer strands and the monomers of the high Tg polymer strands are selected from the group of acrylates, methacrylates, vinyls, styrenes, ethylene, vinyl chloride, vinylidene chloride, maleate esters, fumarate esters, itaconate esters combinations thereof, and mixtures thereof.

10. The ink-jet ink of claim 1, further comprising a colorant, wherein the colorant is a pigment.

11. A method of making an ink-jet ink, comprising:
    dispersing a wax emulsion and a latex particulate in an ink vehicle;

wherein the wax emulsion is present in the ink-jet ink at a concentration ranging from 0.2 wt % to 5 wt %, wherein the wax emulsion has wax particles with sizes ranging from 50 nm to 600 nm;

wherein the latex particulate does not have a core/shell structure and comprises multiple intermingled discrete polymer strands, including:
low Tg polymer strands having a Tg below 50° C., and
high Tg polymer strands having a Tg at 50° C. or above intermingled with the low Tg polymer strands; and wherein the Tg of the high Tg polymer strand is at least 50° C. greater than the Tg of the low Tg polymer strand, and wherein the method further comprises manufacturing the latex particulate by polymerizing a first ratio of multiple co-monomers to form low Tg polymer strands; and polymerizing a second ratio of the same co-monomers to form high Tg polymer strands, to form the latex particulate including the high Tg polymer strands that are discrete and intermingled with the low Tg polymer strands.

12. The method of claim 11, wherein the wax has a melting point ranging from 60° C. to 110° C. and a particle size ranging from 50 nm to 600 nm.

13. An ink-jet ink, comprising:
an ink vehicle;
a wax emulsion; and
a latex particulate, comprising multiple intermingled discrete polymer strands, including:
a low Tg polymer strand having a Tg below 50° C., and
a high Tg polymer strand having a Tg at 50° C. or above;
wherein the Tg of the high Tg polymer strand is at least 50° C. greater than the Tg of the low Tg polymer strand, and wherein the low Tg polymer strand is prepared from multiple co-monomers and the high Tg polymer strand is prepared from the same multiple co-monomers at a different ratio.

14. A method of making the ink-jet ink of claim 13, comprising:
manufacturing the latex particulate by polymerizing a first ratio of multiple co-monomers to form low Tg polymer strands having a Tg below 50° C. and polymerizing a second ratio of the same co-monomers to form high Tg polymer strands having a Tg at 50° C. or above, wherein the Tg of the high Tg polymer strands is at least 50° C. greater than the Tg of the low Tg polymer strands, to form the latex particulate including the high Tg polymer strands that are discrete and intermingled with the low Tg polymer strands; and
dispersing the wax emulsion and the latex particulate in an ink vehicle.

15. An ink-jet ink, comprising:
an ink vehicle;
a wax emulsion present in the ink at a concentration ranging from 0.2 wt % to 5 wt %, wherein the wax emulsion has wax particles with sizes ranging from 50 nm to 600 nm; and
a latex particulate that does not have a core/shell structure, comprising multiple intermingled discrete polymer strands, including:
a low Tg polymer strand having a Tg below 50° C., and
a high Tg polymer strand having a Tg at 50° C. or above;
wherein the Tg of the high Tg polymer strand is at least 50° C. greater than the Tg of the low Tg polymer strand, and wherein the average homopolymer refractive index of monomers of the low Tg polymer strand is within 1% of the average homopolymer refractive index of monomers of the high Tg polymer strand.

* * * * *

UNITED STATES PATENT AND TRADEMARK OFFICE
CERTIFICATE OF CORRECTION

PATENT NO. : 9,732,244 B2
APPLICATION NO. : 14/426572
DATED : August 15, 2017
INVENTOR(S) : David Michael Ingle et al.

It is certified that error appears in the above-identified patent and that said Letters Patent is hereby corrected as shown below:

On the Title Page

Item (12) should read --Ingle et al.--

Item (75) "David Michael Ingle, Jr." should read --David Michael Ingle--

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*